United States Patent
Mishra et al.

(10) Patent No.: US 12,045,839 B1
(45) Date of Patent: Jul. 23, 2024

(54) SYSTEM AND METHOD FOR EVALUATING RULES

(71) Applicant: Charles Schwab & Co., Inc., San Francisco, CA (US)

(72) Inventors: Anshuman Mishra, Highlands Ranch, CO (US); Charles E. Gotlieb, San Juan, PR (US)

(73) Assignee: Charles Schwab & Co., Inc., San Francisco, CA (US)

( * ) Notice: Subject to any disclaimer, the term of this patent is extended or adjusted under 35 U.S.C. 154(b) by 329 days.

(21) Appl. No.: 17/408,363

(22) Filed: Aug. 20, 2021

Related U.S. Application Data

(60) Provisional application No. 63/069,837, filed on Aug. 25, 2020.

(51) Int. Cl.
| | |
|---|---|
| G06F 16/00 | (2019.01) |
| G06F 9/54 | (2006.01) |
| G06Q 30/018 | (2023.01) |
| G06Q 30/0201 | (2023.01) |
| G06Q 30/0251 | (2023.01) |

(52) U.S. Cl.
CPC ........ *G06Q 30/0185* (2013.01); *G06F 9/547* (2013.01); *G06Q 30/0201* (2013.01); *G06Q 30/0254* (2013.01)

(58) Field of Classification Search
None
See application file for complete search history.

(56) References Cited

U.S. PATENT DOCUMENTS

| | | | |
|---|---|---|---|
| 9,552,416 B2 * | 1/2017 | Walther | G16B 5/00 |
| 2011/0276507 A1 * | 11/2011 | O'Malley | G06Q 10/00 705/321 |
| 2015/0363478 A1 * | 12/2015 | Haynes | G06Q 10/06 707/610 |

* cited by examiner

*Primary Examiner* — Tuankhanh D Phan
(74) *Attorney, Agent, or Firm* — Harness, Dickey & Pierce, P.L.C.

(57) ABSTRACT

A system and method reduces or minimizes the number of characteristic values required to evaluate a rule by selecting elements of the rule in an order most likely to allow evaluation of the rule without requiring evaluation of other elements of the rule. The selection may be a function of one or both of the structure of the rule and the probability that an element will resolve to a particular value of true or false.

20 Claims, 4 Drawing Sheets

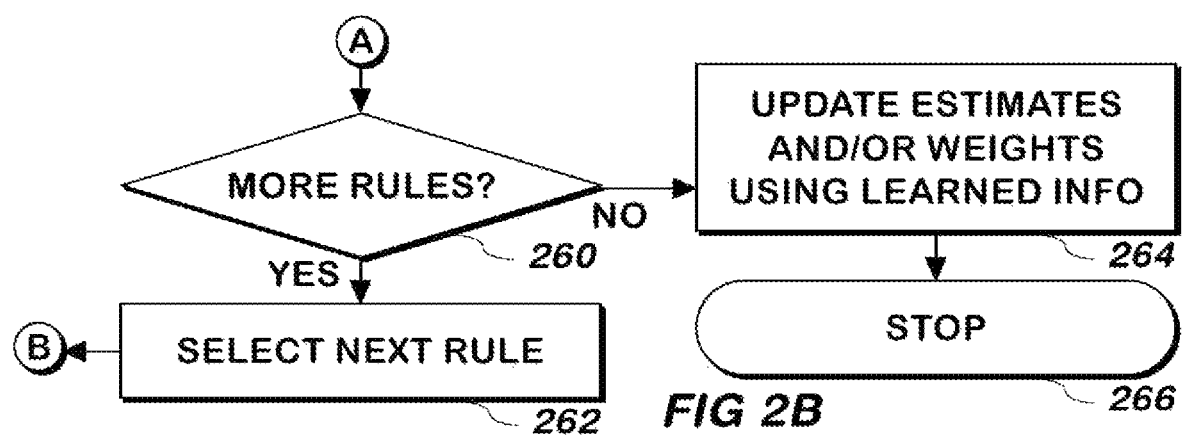

SYSTEM AND METHOD FOR EVALUATING RULES

RELATED APPLICATION

This application claims the benefit of U.S. Patent Application Ser. No. 63/069,837 entitled 'Method and Apparatus for Evaluating Rules', filed by Anshuman Mishra and Charles E. Gotlieb on Aug. 25, 2020, having the same assignee as the present invention and is hereby incorporated by reference in its entirety.

FIELD OF THE INVENTION

The present invention is related to computer software and hardware and more specifically to computer software and hardware for evaluating rules.

BACKGROUND OF THE INVENTION

Individuals may have, or open one or more different types of accounts, and each individual may have characteristics of that individual associated with the account, such as the age and address of the account holder. Characteristics may be express or implied. For example, some individuals may be part of a same household, either based on explicit relationships that are defined, or based on having the same residence address.

In large, distributed, and/or complex computer systems, values of characteristics of account holders may be spread across various systems for which retrieval may involve complexity that may be different for each characteristic. Obtaining these characteristics from an account can be more efficiently handled by micro services such as lookup modules that obtain the value of one or more characteristics for a specified account, but hide the complexity from the entity that wishes to obtain them.

To make an offer to a holder of an account, a simple user interface may be offered that allows the offeror, such as a product marketing manager, to specify values of one or more characteristics of an account, individual or household, and then assign logical operators (e.g. 'and', 'or') between the values of the characteristics. The offeror can then add offer information and request that the offer information be presented to the account holders who meet the characteristics specified. For example, an offer may be defined for account holders where sex=female and age >35. If Sex=female is defined as 'A' and age>35 is defined as 'B', the rule for the offer is A and B. Offers may be based on characteristics of others in addition to or instead of those of the person to whom the offer will be made. For example, the offeror could define an offer to be made to users who have household members over the age of 60, even if the person receiving the offer is not over that age, or in addition to it.

Offers may use any number of elements of values of characteristics with operators between them. So a rule can be as simple, like "A" or as complex, like (A or B or C) and D, where A, B, C and D are each elements of a rule, like "age >35.".

Determining which accounts meet the example of the complex rule above can be determined by using the lookup modules to obtain, for all accounts, the values of A, B, C and D, and then applying the rule to the values to determine whether a given account meets the rule. However, this process is sub optimal. What is needed is a system and method that can make offers to account holders based on characteristics.

SUMMARY OF INVENTION

A system and method takes a rule with two or more elements and orders the elements to, on average, reduce or minimize the number of characteristic values that must be retrieved before the rule can be fully evaluated. The system and method stops requesting lookups if one or more values already requested indicates that the rule does, or does not, apply to the account.

In one embodiment, the system and method weights the elements in each rule based on how much the element influences the outcome, and how likely the element is to allow the rule to be fully evaluated with a reduced or fewest number of other elements required. For example, in a rule "(A or B or C) and D," the factor D would have the highest weight because it can reduce the need to identify the values of the other factors if D is false. Factors A, B and C may initially have equal weights based on their equal ability to influence the outcome, but lower than the weight of factor D because if any one of them were to be evaluated first, they would still require D to also be checked before the result of the rule is known for the account.

However, within (A or B or C), the propensity for one of the factors to be dispositive may influence the weight, so that, for example, if B is more likely to be true than A or C, B may have a higher weight to allow it to be evaluated before A or C, because starting with B first, on average reduces the number of characteristic values that must be retrieved to perform the evaluation within the parentheses or other precedence indicator. Propensity may be determined by learning and/or random sampling, which may be performed while actually applying the rule to a randomly selected initial group, using the information identified from that group to assign an initial set of weights, but then re-weighting if the propensity is learned to be different as the rules are applied outside of the randomly sampled group.

In the case of a different rule, such as, "(A and B and C) or D", D could again have the highest weight because of its ability to potentially determine the outcome without requiring investigation of further factors, while the least likely to be true of A, B and C is assigned the next highest weight, with the remaining two factors assigned lower weights. The assignment of weights is thus to weight "anded" factors based on their ability to cause the rule to evaluate to false, and "ored" factors based on their ability to evaluate to true.

When the rule is being applied to an account, the values corresponding to rule elements with the highest or "most dispositive" weight factor are retrieved first, and then values corresponding to the remaining weights are retrieved in descending or order of the weights, until the rule is met or cannot be met. The rules may be applied to any number, including a large number, of accounts and any number of rules with any number of different factors and any type of logical operators between them, including precedence operators.

Thus, the computer system applying the rule is made more efficient.

DETAILED DESCRIPTION OF A PREFERRED EMBODIMENT

Figure 1:
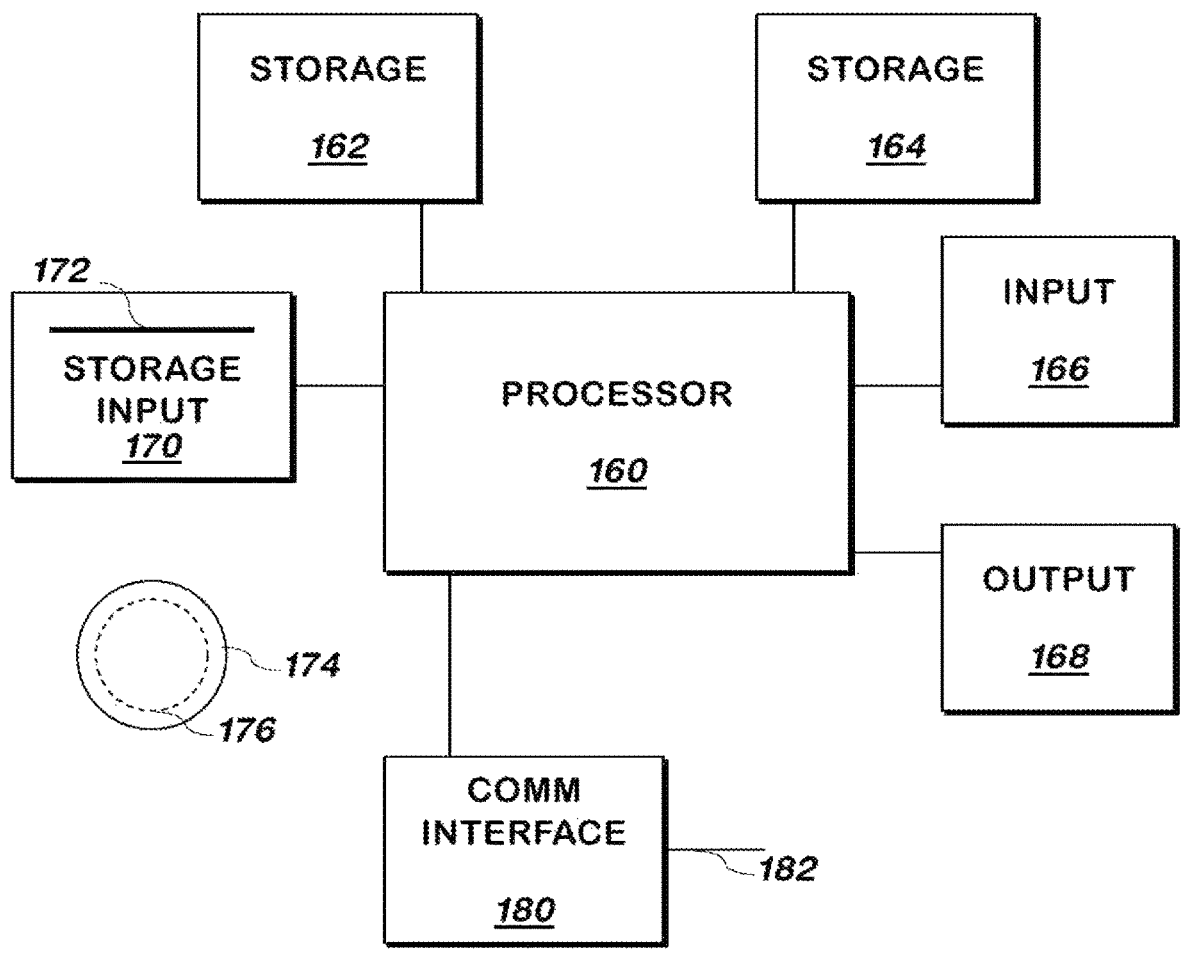
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
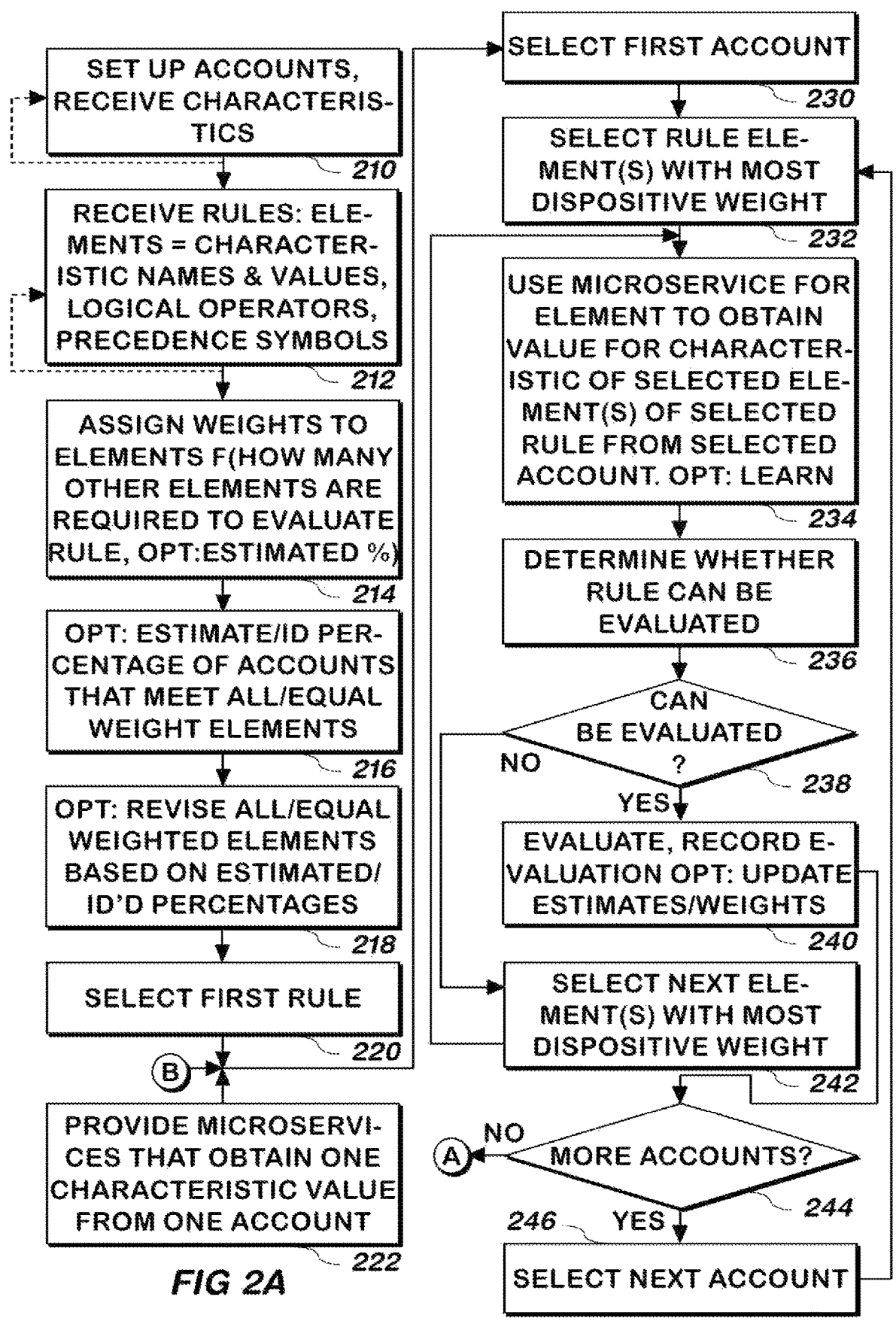
FIG. 2, consisting of FIG. 2A and FIG. 2B, is a flowchart illustrating a method of evaluating rules according to one embodiment of the present invention.

Referring now to FIG. 2A, a method of applying rules to accounts is shown according to one embodiment of the present invention. Accounts are set up, and characteristics of the accounts are received 210. In one embodiment, accounts are financial services accounts, such as those of a brokerage. Characteristics may include characteristics of each account, the individual or individuals who own the account (e.g. age, marital status, residence zip code, etc.), and characteristics of other individuals related to the owner of the account (e.g. age of a family member of a holder of an account). any number of accounts may be set up, and any number of characteristics may be received at any time, as part of an independently running process, as indicated by the dashed line in the figure.

Rules are received 212. In one embodiment, each rule includes one or more boolean elements (e.g. account holder's age >30), an element comprising a name of a characteristic, and one or more values of the characteristic, and optionally a relationship between the name of the characteristic and the one or more values, such as equality, greater than, less than, etc. Where no relationship is specified, a relationship may be implied, such as equality. If multiple elements are specified for a rule, logical operators, such as and, or, not, exclusive or may be specified between them. In one embodiment, precedence symbols, such as parentheses may be specified to force evaluation of sets of elements before other sets, and to allow the logical operators to operate on the sets. Any number of rules containing any number of elements and any number of logical operators and precedence symbols may be received as part of step 212, at any time, as part of an independently running process as indicated by the dashed line in the figure.

Weights are assigned to be elements of each rule received 214. In one embodiment, weights are assigned as a function of how many other elements are required to evaluate the rule. Thus the rule, with four elements A, B, C, D specified as '(A or B or C) and D' could be weighted with D having a weight of one, and the other elements having weights of one. D has a higher, more-dispositive weight indicating it should be evaluated first because the rule can be fully evaluated if D is false. Full evaluation may be made because the rule can be fully evaluated to true, or because it may be fully evaluated to false. In the example above, D is weighted higher than A, B or C because it evaluates the rule to false without requiring the Boolean values of A, B, or C, while each of A, B, or C also requires, at a minimum, the boolean value of D.

The percentage of accounts causing elements to evaluate true or false is identified, or estimated for some or all elements of each rule 216. In one embodiment, only the equal weighted elements are identified or evaluated, and in other embodiments still other elements are identified or estimated. Equal weighted elements in the example above would include A, B, and C, however element D may be evaluated as well. To identify the percentage of accounts causing an element to evaluate to true or false, the micro services described below may be used to obtain all of the Boolean element values for the accounts. So for example, if element B requires an age of the account holder above 30, identifying element B may include identifying the percentages of accounts having an account holder with an age above 30. To estimate this percentage, a fraction of the accounts may be used to determine the percentage of the fraction for which the element is true or false. To estimate element B in the example above, 3% of the accounts may be randomly selected and used to determine the percentage of such 3% for which element B is true or false and this percentage is used as the estimate of element B for all accounts, until the estimate is updated. In one embodiment, combinations of elements may be identified or estimated when identifying or estimating the percentages of the individual elements, where such combinations may allow weights to be adjusted as described herein. In one embodiment neither technique of identification or estimation is used during the first pass of any rule or during the entire first pass of any rule, and the estimation technique is used on the first pass after a sufficient number of values (e.g. 3% of the total) have been obtained, and the estimations are updated either during or after the pass.

The weights of the equal weighted elements, or all elements may be adjusted 218 based on the estimated or identified percentage of accounts obtained in step 216. The weights are adjusted to force evaluations of elements that are more likely to cause the rule to be fully evaluated to be made sooner than other elements. Using the example above, if element B evaluates to true for a higher percentage of accounts then elements A or C, the weight for element B is adjusted more dispositively (e.g. higher if the higher weighted elements should be chosen first and lower if the lower weighted elements should be chosen first) than the weights for elements A or C. Non-equal weighted elements may have their weights adjusted as well (and the adjustments may depend on the estimated or identified values of the element being considered for adjustment relative to other elements), so for example if element D evaluates to true more than 50% of the time, and elements A, B and C each evaluate to true less or much less than 50% of the time, or all evaluate to true less than 50% of the time, the weight for element D may be reduced (because the set of A, B and C will cause the rule to evaluate to false without requiring element D to be evaluated). The weights so adjusted, then become the weights to be used for evaluation of the rules.

In one embodiment, step 216 is not separately performed. Instead, step 216 is performed as the first X % (e.g. 3%) of accounts are processed as described herein using the weights defined as per step 214 and then the weights are updated after the 3% threshold has been reached. In one such embodiment, during this period, all elements for a rule are evaluated, requiring all of their corresponding characteristic values to be retrieved. In still another embodiment, equal weighted elements are evaluated at random, and the weights are adjusted when all elements for a rule have met the threshold (e.g. 3%) for retrieval.

The first rule is selected 220, and the first account is selected 230. In one embodiment, steps 220 and 230 are performed in the opposite order (and step 244 is swapped with step 260 and step 246 is swapped with step 262) to allow all of the rules to be applied to the same account before the next account is processed. The rule element or elements of the selected rule with the most dispositive weight for which the characteristic value or status of the element is not already known for the account is selected 232.

In one embodiment, a set of micro services are provided 220, with each micro service obtaining one or more characteristic values from one account. Micro services may be used if characteristic values are dispersed or complex to obtain, allowing the micro service to hide the complexity required to obtain the characteristic value.

The microservice that retrieves the characteristic value corresponding to the selected rule element is used to obtain the value of that characteristic from the selected account 234. If the microservice obtains other values, those other values may also be obtained for the selected account and stored for any other element corresponding to the other value or values retrieved for the selected account as part of step 234 so that the microservice does not need to be called again for the account.

In one embodiment, the method learns from each value retrieved that is used to compute the weights, either the next time the method runs, or as it runs. In such embodiment, the number of each characteristic value retrieved is stored, and, for each element that uses that characteristic value, for example from different rules, the number of times the characteristic value retrieved indicated that characteristic was true, false or not available is also maintained to establish or update the probabilities for use as described herein. The various techniques of performing this learning are described herein and above.

In one embodiment, characteristic values and an identifier of the characteristic that are used for other rules are stored associated with the account identifier, which is retained when the account is selected. In another embodiment, if any of the rule elements are reused in different rules, the true or false status of the rule element or elements to which the retrieved characteristic values correspond may also or instead be retained for the account.

A determination is made as to whether the selected rule can be evaluated to true or false given the characteristic values retrieved 236. For example, if the characteristic value for element D was retrieved and caused element D to evaluate to true, and the characteristic value for element C was retrieved and caused element C to evaluate to true, the rule can be evaluated to true without retrieving further characteristic values of the rule. The determination may be made from characteristic values requested and received, other characteristic values that were received with such values, and characteristic values that were already received and stored for that account, either explicitly or as part of the other values retrieved by the microservice, when a different rule was being evaluated for that account.

If the rule can be evaluated 238, the rule is evaluated and the rule identifier of the selected rule and the result is stored with an identifier of the selected account, and no further microservices are used for the rule and account, saving the resources required to do so 240. In one embodiment, the estimates are updated for any element for which the number of retrievals exceeds any number used to originally estimate the elements, and the weights may be updated based on the estimates as part of step 240. The method continues at step 244.

In one embodiment, the rule is considered able to be evaluated if there are no more elements and the data is insufficient to evaluate the rule to true or false, in which case, the rule may be stored with an evaluation of 'undetermined' for the selected account as part of step 240.

If the rule cannot be evaluated based on the information available 238, the next element of the selected rule with the most dispositive weight is selected 242 and the method continues at step 234 using the newly selected element.

At step 244, if there are more accounts, the next account is selected 246 and the method continues at step 232 using the newly selected account and otherwise 244, the method continues at step 260 of FIG. 2B.

At step 260, if there are more rules, the next rule is selected 262 and the method continues at step 230 using the newly selected rule, and otherwise 260, estimates and/or weights may be updated as described above if they are not updated as part of step 240. As noted, instead of selecting a rule and then selecting accounts for which the rule may be applied, accounts may be selected and all rules applied to the account. Using this latter approach can reduce the storage requirements to store characteristic values required to evaluate elements, when the same characteristic value or element is used in multiple rules.

System.

Figure 3:
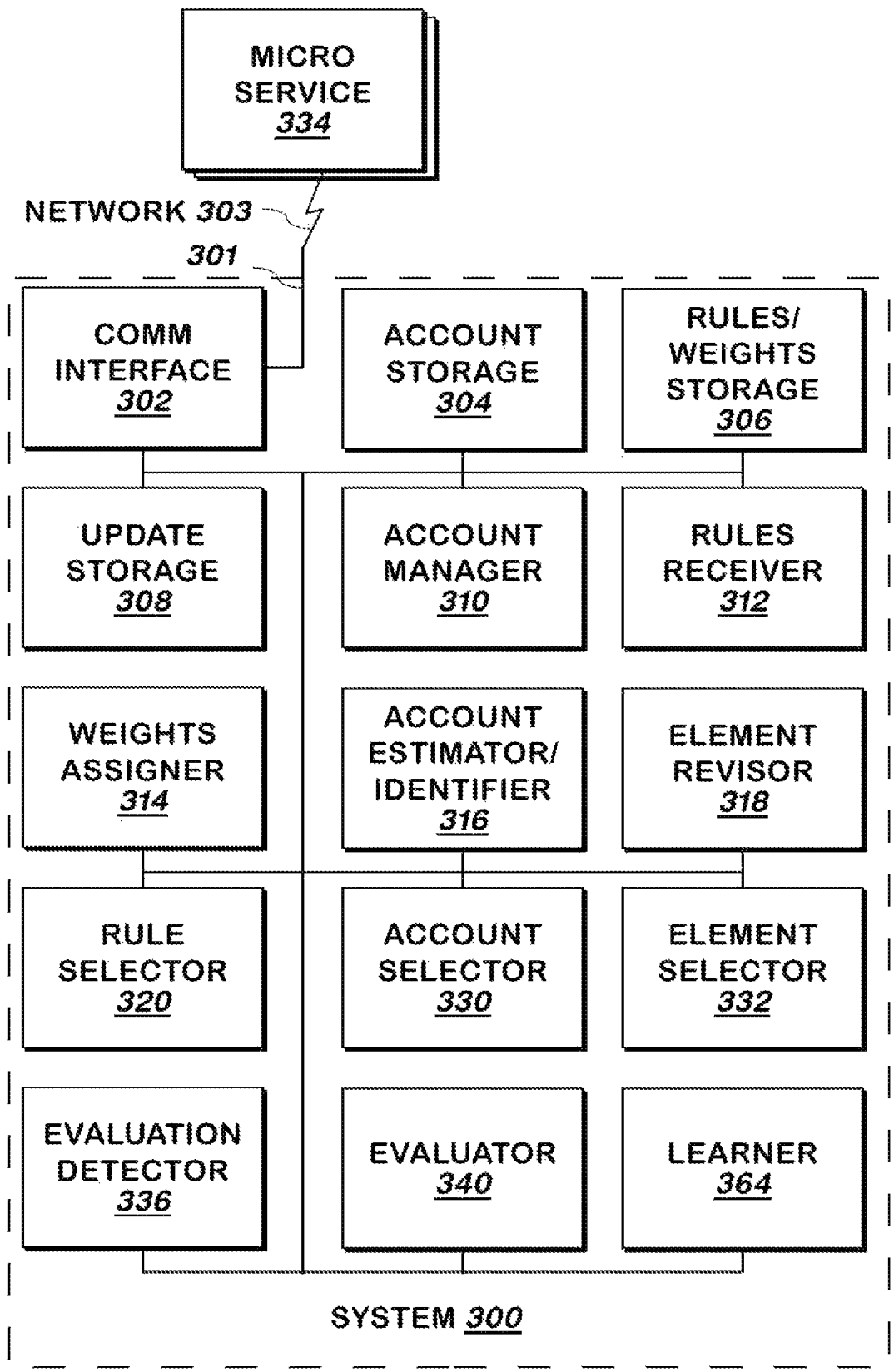
FIG. 3 is a block schematic diagram of a system for according to one embodiment of the present invention.

Referring now to FIG. 3, a system 300 for evaluating rules is shown according to one embodiment of the present invention. System 300 includes communication interface 302, which includes a conventional communication interface such as a TCP/IP-compatible communication interface running suitable communication protocols, such as Ethernet, TCP/IP, and other communication protocols. Unless otherwise specified, all communication into, or out of, system 300, is made via communication interface 302. Communication interface 302 includes input/output 301 which is coupled to a network 303, such as an ethernet network, and/or the networks that make up the Internet.

Account manager 310 allows users to set up accounts, and provide characteristics of the user and other individuals and items, and account manager 310 receives such information and stores it into account storage 304. Rules receiver 312 receives rules that are made up of elements which are characteristic names and values along with logical operators that define a logical relationship, such as "Sex=M AND Age <50", which is a rule with two elements and an operator "AND" between them, and optionally precedence symbols, and stores such information into rules/weights storage 306 associated with a unique identifier of each rule, and an identifier of each element that is unique within the rule. Each time a rule is stored into rules weights storage 306 by rules receiver 312, rules receiver 312 signals weights assignor 314 with an identifier of the rule. Account storage 304, and rules/weights storage 306 each include conventional memory or disk storage, and may include a conventional database.

When signaled, weights assignor 314 assigns weights to each element of the rule corresponding to the rule identifier it receives, as described above and stores into rules/weights storage 306 the weights associated with each element of each rule that it assigns. In one embodiment, if weights assignor 314 assigns equal weights to two or more elements, weights assignor 314 signals account estimator/identifier 316 with an identifier of the rule. In another embodiment, weights assignor 314 always signals account estimator/identifier 316 with an identifier of the rule each time it assigns weights to elements of each rule.

When signaled, account estimator/identifier 316 estimates or identifies the percentage of accounts that meet each element of the rule corresponding to the signal, or only the equal weighted elements of each rule as described above. Account estimator/identifier 316 signals element revisor 318 with the identifier of the rule and each element and the percentage it identified or estimated. When signaled, element revisor 318 revises all of the elements, or the equal weighted elements based on the information it receives from account estimator/identifier 316, all as described above.

Periodically or occasionally, rule selector 320 selects the first rule stored in rules/weights storage 306, and provides the identifier of the first rule to account selector 330. When it receives such identifier, account selector 330 selects the first account in account storage 304, and provides an identifier of the selected account and the identifier of the rule it received to element selector 332. When it receives such information, element selector 332 selects the element or elements with the most dispositive weight as described above, selects one or more micro services based on the information required to evaluate the selected element or elements, and provides the identifiers of the account and value it received and the element identifier or identifiers it selected to the selected one or more micro services 334. In one embodiment, the micro services 334 are not part of system 300 and in another embodiment, they are.

Each micro service 334 is one of several micro services that can retrieve information, such as information about an account, or information related to an account as described herein. The micro service selected by element selector 332 is based on the information required to evaluate the selected element or elements, which may be stored in a table in rules/weights storage 306 by a system administrator that maps information that each micro service is able to retrieve with the identifier and location on the network of the specific micro service 334 that can retrieve it. Each micro service 334 selected by element selector 332 retrieves the information corresponding to the micro service from the account whose identifier it receives and provides such information, along with the other information it received to element selector 332. Element selector 332 evaluates the one or more elements it selected based on the information it receives from micro service 334 and adds the values received from the one or more micro services 334 and the Boolean results of the evaluation or evaluations associated with the identifier of the element to which the boolean result corresponds to a rule object for the rule and account, that also contains the identifiers of the rule, and account it receives that it adds when it builds the rule object when it first receives the rule and account identifiers. Element selector 332 provides the rule object to evaluation detector 336.

When it receives the rule object, evaluation detector 336 determines whether the rule can be evaluated with the results obtained for the rule and account thus far. If not, evaluator 340 provides the rule object to element selector 332, which selects the next element or elements with the most dispositive weight, and repeats the process beginning with obtaining the information from one or more micro services 334, as described above. If the rule may be evaluated, evaluation detector 336 provides the rule object to evaluator 340.

When it receives the rule object, evaluator 340 evaluates the rule based on the Boolean result or results of each of the elements obtained thus far, along with the rule stored in rules/weights storage 306 that is associated with the rule identifier of the rule object. Evaluator 340 may optionally update estimates or weights as described above using the Boolean results, and/or values received from the one or more micro services in the rule object, which it may store in update storage 308, which includes memory or disk storage. Evaluator 340 may take an action, such as providing an advertisement or other information to a holder of the account in the rule object. Evaluator 340 then provides the rule object to account selector 330. Account selector 330 obtains the rule and account identifiers from the rule object, destroys the rule object, and determines if there are more accounts that have not been selected for processing using the rule identifier from the rule object. If so, account selector 330 selects the next account from account storage 304, and provides the account identifier of the newly selected account, along with the rule identifier to element selector 332, which repeats the process described above. If there are no unselected accounts for the rule, account selector 330 provides the rule identifier to rule selector 320.

When it receives the rule identifier, rule selector 320 determines whether there are more unselected rules in rules/10 weights storage 306, and if so it selects the next unselected rule, and provides the identifier of the newly selected rule to account selector 330, which repeats the process described above. if there are no more unselected rules, rule selector 320 signals learner 364. When signaled, learner 364 updates the estimates and/or weights in rules/weights storage 306 using the information learned in update storage 308, as described above.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Communication interface includes a conventional TCP/IP-compatible communication interface. Unless otherwise noted, all communication to and from the system of the present invention is made via the communication interface.

Certain Embodiments

Described is a computer-implemented method of evaluating two or more rules to perform two or more actions, including:
  receiving the two or more rules, each including two or more elements and a definition of at least one logical relationship including "and" and/or "or" between each of the elements;
  at least one selected from a first group including A and B:
    A. identifying a weight for each of the two or more elements in each of the two or more rules responsive to a minimum number of the other elements in said rule required to evaluate said rule after said element is evaluated; and
    B. identifying the weight for at least two of the two or more elements in each of the two or more rules responsive to an identification or estimation of a percentage of times said at least two of the two or more elements will evaluate to true or false;
  at a computer system, for each rule in the plurality and for each of two or more accounts:
    C. selecting an element of said rule responsive to the weight of the element relative to the weights of other elements in said rule;
    D. calling a computer microservice over a network to evaluate the selected element for said account, at a different computer system and return the result to the first computer system over the network;
    E. determining whether said rule is able to be evaluated using the result of the microservice call for at least one element selected from the rule;
    F. responsive to the rule being able to be evaluated using the result of the microservice call for at least one element selected from the rule, evaluating the rule; and
    G. responsive to the rule not being able to be evaluated using the result of the microservice call for the at least one element selected from the rule, selecting an other unselected element of said rule responsive to the weight of the other element relative to the weights of any of at least one other unselected elements in said rule and repeating steps D and E and F or G; and
  performing an action responsive to the evaluation of each of the rules in the plurality.

The method, may contain additional features whereby the group includes A.

The method, may contain additional features whereby the group includes B.

The method, may contain additional features whereby the at least two of the two or more elements in each of the two or more rules includes all of the two or more elements in each of the two or more rules.

The method, may contain additional features whereby:
  the group includes A and B; and
  the identifying in B follows the identifying in A for each of the two or more rules.

The method, may contain additional features whereby the at least two of the two or more elements comprise at least one element in a rule identified as having a weight equal to at least one other element in that rule.

Described is a system for evaluating two or more rules to perform two or more actions, including:
  a rules receiver, the rules receiver having an input for receiving the two or more rules, each including two or more elements and a definition of at least one logical relationship including "and" and/or "or" between each of the elements, the rules receiver for providing the two or more rules at an output;
  at least one selected from a first group including A and B:
    A. a weights assignor having an input coupled to the rules receiver output for receiving the two or more rules, the weights assignor for identifying a weight for each of the two or more elements in each of the two or more rules responsive to a minimum number of the other elements in said rule required to evaluate said rule after said element is evaluated, the weights assignor for providing at an output the weights for each element; and
    B. an account estimator/identifier having an input coupled to the rules receiver output for receiving the two or more rules, the account estimator/identifier for identifying the weight for at least two of the two or more elements in each of the two or more rules responsive to an identification or estimation of a percentage of times said at least two of the two or more elements will evaluate to true or false, and for providing at an output the weights for each element;
  at a computer system, for each rule in the plurality, and for each of two or more accounts:
    an element selector having an input coupled to the rules receiver output for receiving said rule, the element selector for selecting an element of said rule responsive to the weight of the element relative to the weights of other elements in said rule and calling one of two or more computer microservices over a network to evaluate the selected element at a different computer system;
    an evaluation detector having an input coupled to the two or more computer microservices for receiving a result from any call of any of the two or more computer microservices, the evaluation detector for determining whether said rule is able to be evaluated using any result of any microservice call for at least one element selected from the rule for the account, and for providing at an output an indication having a first state and a second state responsive to the determining;

an evaluator having an input coupled to receive the indication, the evaluator, for, responsive to the indication indicating the rule is able to be evaluated using the result of the microservice call for at least one element selected from the rule, evaluating the rule using the result of the microservice call received at the evaluator input, and performing an action responsive to the evaluation of said rule; and F. may contain additional features whereby:

the element selector input is additionally coupled for receiving the result of the microservice call and the indication; and the element selector is additionally for, responsive to the indication indicating the rule is not being able to be evaluated using the microservice call for the at least one element selected from the rule, selecting an other unselected element of said rule responsive to the weight of the other element relative to the weights of any of at least one other unselected elements in said rule and calling a different one of the two or more computer microservices over the network to evaluate the selected element at the different computer system to trigger operation of the evaluation detector, and the evaluator or element selector.

The system, may contain additional features whereby the group includes A.

The system, may contain additional features whereby the group includes B.

The system, may contain additional features whereby the at least two of the two or more elements in each of the two or more rules includes all of the two or more elements in each of the two or more rules.

The system, may contain additional features whereby:
the group includes A and B;
the account estimator/identifier identifies the weight for the at least two of the two or more elements in each of the two or more rules, additionally responsive to the weights for the respective element identified by the weights assignor; and
the account estimator input is additionally coupled to the weights assignor output for receiving the weights for said respective elements identified by the weights assignor; and.

The system may contain additional features whereby the at least two of the two or more elements comprise at least one element in a rule identified as having a weight equal to at least one other element in that rule.

Described is a computer program product including a nontransitory computer useable medium having computer readable program code embodied therein for evaluating two or more rules to perform two or more actions, the computer program product including computer readable program code devices configured to cause a computer system to:

receive the two or more rules, each including two or more elements and a definition of at least one logical relationship including "and" and/or "or" between each of the elements;

at least one selected from a first group including A and B:

A. identify a weight for each of the two or more elements in each of the two or more rules responsive to a minimum number of the other elements in said rule required to evaluate said rule after said element is evaluated; and B. identify the weight for at least two of the two or more elements in each of the two or more rules responsive to an identification or estimation of a percentage of times said at least two of the two or more elements will evaluate to true or false;

at a computer system, for each rule in the plurality and for each of two or more accounts:

C. select an element of said rule responsive to the weight of the element relative to the weights of other elements in said rule;

D. call a computer microservice over a network to evaluate the selected element for said account, at a different computer system and return the result to the first computer system over the network;

E. determine whether said rule is able to be evaluated using the result of the microservice call for at least one element selected from the rule;

F. responsive to the rule being able to be evaluated using the result of the microservice call for at least one element selected from the rule, evaluate the rule; and G. responsive to the rule not being able to be evaluated using the result of the microservice call for the at least one element selected from the rule, select an other unselected element of said rule responsive to the weight of the other element relative to the weights of any of at least one other unselected elements in said rule and repeating operation of D and E and F or G; and performing an action responsive to the evaluation of each of the rules in the plurality.

The computer program product, may contain additional features whereby the group includes A.

The computer program product, may contain additional features whereby the group includes B.

The computer program product, may contain additional features whereby the at least two of the two or more elements in each of the two or more rules includes all of the two or more elements in each of the two or more rules.

The computer program product, may contain additional features whereby:

the group includes A and B; and the computer program product including computer readable program code devices configured to cause the computer system to identify in B follows operation of the computer program product including computer readable program code devices configured to cause the computer system to identify in A for each of the two or more rules.

The computer program product, may contain additional features whereby the at least two of the two or more elements comprise at least one element in a rule identified as having a weight equal to at least one other element in that rule.

What is claimed is:

1. A computer-implemented method of evaluating a plurality of rules to perform a plurality of actions, comprising:

receiving the plurality of rules, each comprising a plurality of elements and a definition of at least one logical relationship comprising "and" and/or "or" between each of the elements;

at least one selected from a first group comprising A and B:

A. identifying a weight for each of the plurality of elements in each of the plurality of rules responsive to a minimum number of the other elements in said rule required to evaluate said rule after said element is evaluated; and
B. identifying the weight for at least two of the plurality of elements in each of the plurality of rules responsive to an identification or estimation of a percentage of times said at least two of the plurality of elements will evaluate to true or false;

at a first computer system, for each rule in the plurality of rules and for each of a plurality of accounts:

C. selecting an element of said rule responsive to the weight of the element relative to the weights of other elements in said rule;
D. calling a computer microservice over a network to evaluate the selected element for said account, at a different computer system and return the result to the first computer system over the network;
E. determining whether said rule is able to be evaluated using the result of the microservice call for at least one element selected from the rule;
F. responsive to the rule being able to be evaluated using the result of the microservice call for at least one element selected from the rule, evaluating the rule; and
G. responsive to the rule not being able to be evaluated using the result of the microservice call for the at least one element selected from the rule, selecting an other unselected element of said rule responsive to the weight of the other element relative to the weights of any of at least one other unselected elements in said rule and repeating steps D and E and F or G; and performing an action responsive to the evaluation of each of the rules in the plurality.

2. The method of claim 1, wherein the group comprises A.

3. The method of claim 1, wherein the group comprises B.

4. The method of claim 1, wherein the at least two of the plurality of elements in each of the plurality of rules comprises all of the plurality of elements in each of the plurality of rules.

5. The method of claim 1, wherein:
the group comprises A and B; and
the identifying in B follows the identifying in A for each of the plurality of rules.

6. The method of claim 5, wherein the at least two of the plurality of elements comprise at least one element in a rule identified as having a weight equal to at least one other element in that rule.

7. A system for evaluating a plurality of rules to perform a plurality of actions, comprising:
at least one processor configured to execute computer readable instructions to cause the system to,
receive the plurality of rules, each comprising a plurality of elements and a definition of at least one logical relationship comprising "and" and/or "or" between each of the elements;
at least one selected from a first group comprising A and B:
A. identify a weight for each of the plurality of elements in each of the plurality of rules responsive to a minimum number of the other elements in said rule required to evaluate said rule after said element is evaluated; and
B. identify the weight for at least two of the plurality of elements in each of the plurality of rules responsive to an identification or estimation of a percentage of times said at least two of the plurality of elements will evaluate to true or false;

for each rule in the plurality, and for each of a plurality of accounts:

C. select an element of said rule responsive to the weight of the element relative to the weights of other elements in said rule;
D. call one of a plurality of computer microservices over a network to evaluate the selected element at a different computer system;
E. receive a result from any call of any of the plurality of computer microservices, determine whether said rule is able to be evaluated using any result of any microservice call for at least one element selected from the rule for the account, and provide at an output an indication having a first state and a second state responsive to the determining;
F. responsive to the indication indicating the rule is able to be evaluated using the result of the microservice call for at least one element selected from the rule, evaluate the rule using the result of the microservice call, and perform an action responsive to the evaluation of said rule; and wherein:
G. responsive to the indication indicating the rule is not being able to be evaluated using the microservice call for the at least one element selected from the rule, selecting an other unselected element of said rule responsive to the weight of the other element relative to the weights of any of at least one other unselected elements in said rule and calling a different one of the plurality of computer microservices over the network to evaluate the selected element at the different computer system to trigger operations D, E, F, or G.

8. The system of claim 7, wherein the group comprises A.

9. The system of claim 7, wherein the group comprises B.

10. The system of claim 7, wherein the at least two of the plurality of elements in each of the plurality of rules comprises all of the plurality of elements in each of the plurality of rules.

11. The system of claim 7, wherein:
the group comprises A and B; and
the at least one processor is further configured to execute computer readable instructions to cause the system to:
identify the weight for the at least two of the plurality of elements in each of the plurality of rules, additionally responsive to the weights for the respective element.

12. The system of claim 11, wherein the at least two of the plurality of elements comprise at least one element in a rule identified as having a weight equal to at least one other element in that rule.

13. A non-transitory computer useable medium having computer readable program code embodied therein, which when executed by at least one processor of a first computer system, causes the first computer system to:
receive the plurality of rules, each comprising a plurality of elements and a definition of at least one logical relationship comprising "and" and/or "or" between each of the elements;
at least one selected from a first group comprising A and B:
A. identify a weight for each of the plurality of elements in each of the plurality of rules responsive to a minimum number of the other elements in said rule required to evaluate said rule after said element is evaluated; and B. identify the weight for at least two of the plurality of elements in each of the plurality of rules responsive to an identification or estimation of a percentage of times said at least two of the plurality of elements will evaluate to true or false; at a computer system, for each rule in the plurality of rules and for each of a plurality of accounts:

C. select an element of said rule responsive to the weight of the element relative to the weights of other elements in said rule;

D. call a computer microservice over a network to evaluate the selected element for said account, at a different computer system and return the result to the first computer system over the network;

E. determine whether said rule is able to be evaluated using the result of the microservice call for at least one element selected from the rule;

F. responsive to the rule being able to be evaluated using the result of the microservice call for at least one element selected from the rule, evaluate the rule; and G. responsive to the rule not being able to be evaluated using the result of the microservice call for the at least one element selected from the rule, select another unselected element of said rule responsive to the weight of the other element relative to the weights of any of at least one other unselected elements in said rule and repeating operation of D and E and F or G; and performing an action responsive to the evaluation of each of the rules in the plurality.

14. The non-transitory computer useable medium of claim 13, wherein the group comprises A.

15. The non-transitory computer useable medium of claim 13, wherein the group comprises B.

16. The non-transitory computer useable medium of claim 13, wherein the at least two of the plurality of elements in each of the plurality of rules comprises all of the plurality of elements in each of the plurality of rules.

17. The non-transitory computer useable medium of claim 13, wherein:
the group comprises A and B; and
the computer readable program code, when executed by the at least one processor, further causes the computer system to perform the identifying in B following the identifying in A for each of the plurality of rules.

18. The non-transitory computer useable medium of claim 17, wherein the at least two of the plurality of elements comprise at least one element in a rule identified as having a weight equal to at least one other element in that rule.

19. The method of claim 1, wherein the identification or the estimation of the percentage of times said at least two of the plurality of elements will evaluate to true or false is performed on a desired number of accounts of the plurality of accounts, the desired number of accounts being a subset of a total number of the plurality of accounts.

20. The method of claim 19, wherein the identifying the weight for the at least two of the plurality of elements further includes adjusting a first weight corresponding to a first element of the at least two elements to a more dispositive value in response to results of the identification or the estimation indicating that the first element is more dispositive than remaining elements of the at least two elements.

* * * * *